No. 666,319. Patented Jan. 22, 1901.
C. KLAUBERG.
BRUSH HANDLE.
(Application filed Apr. 2, 1900.)
(No Model.)
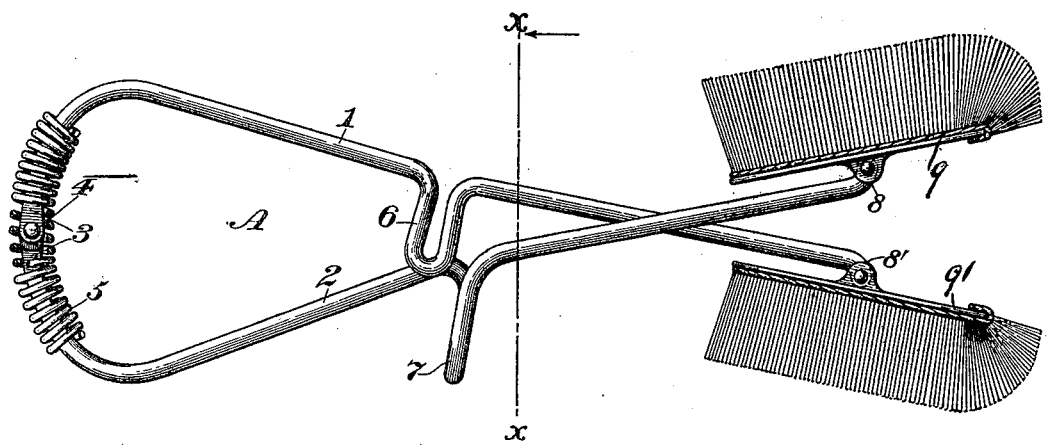
Fig. 1.
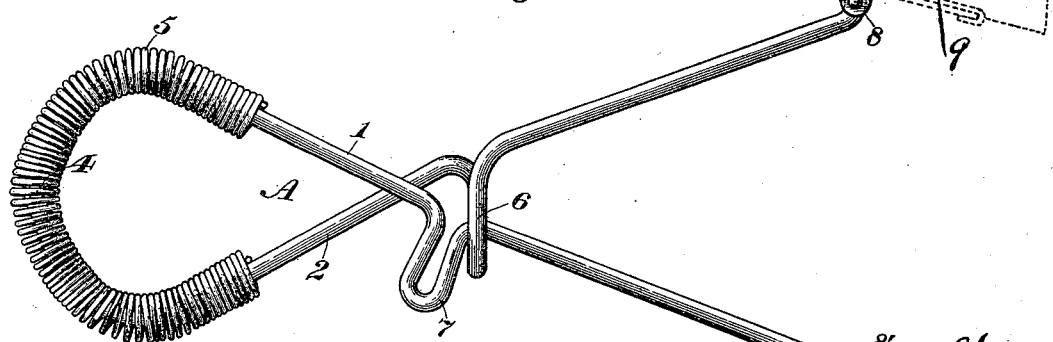
Fig. 2.
Fig. 3.
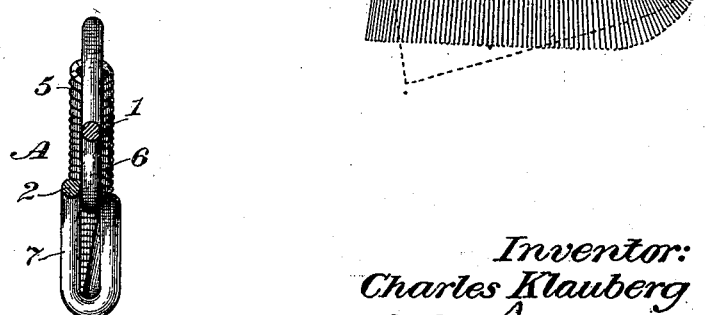
Witnesses:
O. W. Smith
R. W. Pittman
Inventor:
Charles Klauberg
by F. A. Richards,
Atty.
THE NORRIS PETERS CO., PHOTO-LITHO., WASHINGTON, D. C.

United States Patent Office.

CHARLES KLAUBERG, OF NEW YORK, N. Y.

BRUSH-HANDLE.

SPECIFICATION forming part of Letters Patent No. 666,319, dated January 22, 1901.

Application filed April 2, 1900. Serial No. 11,115. (No model.)

*To all whom it may concern:*

Be it known that I, CHARLES KLAUBERG, a citizen of the United States, residing in New York, in the county of New York and State of New York, have invented certain new and useful Improvements in Brush-Handles, of which the following is a specification.

My invention relates to handles for devices—for instance, brushes—for cleaning ware of various kinds, such as lamp-chimneys, globes, bottles, &c.

Primarily the object of my invention is to manufacture economically an improved handle from wire and to provide means for preventing the flexure of the wire while the brushes or other devices to which the handles may be attached are in operation.

In the accompanying drawings, in which like characters designate like parts throughout the several views, Figure 1 is a side elevation of my improved handle in its normal position and shown connected to a pair of brushes. Fig. 2 is a similar view illustrating the parts of the handle expanded and the brushes in condition for work; and Fig. 3 is a cross-section on line $xx$, Fig. 1, looking in the direction of the arrow.

Referring to the drawings, my improved handle is designated generally by A and is shown consisting of two arms 1 and 2, formed of wire of any suitable cross-section and of any desired length. These arms 1 and 2 are flattened or otherwise suitably shaped at one end, as at 3, and are united by a pivotal connection 4. (Shown as a rivet.) Surrounding this pivotal connection is a coiled spring, (designated by 5,) which may either be arranged around the ends of the sections, as shown in Fig. 1, or may be extended over said ends and along the parts of the handles to afford a convenient hand-grasp, as illustrated in Fig. 2.

At an intermediate point in the length of each handle arm or section the wire is provided with a suitable stop of any desired kind, but is preferably bent to form stops or loops 6 and 7, respectively, which when the arms are expanded will prevent the flexure of said arms when the devices to which they are attached are being operated. These stops or bends serve to render the wire more rigid, while one of them, 6, receives that portion of arm 1 immediately adjacent to loop 7, and consequently prevents both arms from lateral movement. (See Fig. 2.)

At its free ends the wire of which the arms are constructed is flattened, as at 8 8', to receive the pivots of suitable brushes 9 9'. (Shown attached thereto.)

As will be observed, my improved handle, while of exceedingly simple construction, has a wide range of action, (from the position shown in Fig. 1 to that shown in Fig. 2 or any intermediate position,) thereby fitting it for application to various devices, and especially to brushes 9 9' for cleaning various sizes and kinds of ware.

While my invention is shown applied to brushes, yet it is not limited thereto, for it may be employed with various devices unnecessary to mention. Furthermore, the invention is not limited to the pivotal connections shown, for the handle ends may be united in other ways and may be connected in a different manner to the device to which the handle is to be applied.

Having thus described my invention, what I claim is—

1. A wire handle comprising pivoted arms, and a spring surrounding said arms adjacent to the pivot thereof.

2. A wire handle comprising arms united for swinging movement; a coiled spring cooperating with, and surrounding a portion of, each arm; and stops for preventing lateral flexure of the arms.

3. A wire handle comprising arms flattened at their ends; a pivot for uniting said ends; a coiled spring surrounding the arms adjacent to the pivot; and loop-shaped stops for preventing flexure of the arms.

4. In combination, with a pair of brushes, a wire handle composed of two sections pivoted together at one end and connected to said brushes at the other end; a coiled spring surrounding said sections at their pivoted ends; and loop-shaped stops intermediate the brushes and pivot.

CHARLES KLAUBERG.

Witnesses:
FRED. J. DOLE,
C. E. VOSS.